United States Patent
Filiz et al.

(10) Patent No.: US 10,423,265 B2
(45) Date of Patent: Sep. 24, 2019

(54) TEMPERATURE COMPENSATING FORCE SENSOR

(71) Applicant: Apple Inc., Cupertino, CA (US)

(72) Inventors: Sinan Filiz, Sunnyvale, CA (US); James E. Pedder, Thame (GB); Charley T. Ogata, San Jose, CA (US); John Stephen Smith, San Jose, CA (US); Dhaval Chandrakant Patel, San Jose, CA (US); Shin John Choi, Sunnyvale, CA (US); Brian Q. Huppi, San Francisco, CA (US); Christopher J. Butler, Cupertino, CA (US); Martin P. Grunthaner, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 15/607,291

(22) Filed: May 26, 2017

(65) Prior Publication Data

US 2017/0269757 A1 Sep. 21, 2017

Related U.S. Application Data

(63) Continuation of application No. 14/729,172, filed on Jun. 3, 2015, now Pat. No. 9,665,200, which is a
(Continued)

(51) Int. Cl.
*G06F 3/041* (2006.01)
*G01L 1/18* (2006.01)
(Continued)

(52) U.S. Cl.
CPC ............ *G06F 3/0414* (2013.01); *G01L 1/005* (2013.01); *G01L 1/16* (2013.01); *G01L 1/18* (2013.01);
(Continued)

(58) Field of Classification Search
CPC ...... G06F 3/0414; G06F 3/0412; G06F 3/045; G06F 3/0416; G06F 3/044;
(Continued)

(56) References Cited

U.S. PATENT DOCUMENTS 3,543,568 A 12/1970 Russell
3,745,502 A 7/1973 Watanabe
(Continued)

FOREIGN PATENT DOCUMENTS

CN 1527933 A 9/2004
CN 1796955 7/2006
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Ibrahim A Khan
(74) *Attorney, Agent, or Firm* — Brownstein Hyatt Farber Schreck, LLP

(57) ABSTRACT

An optical force sensor, which may be used as input to an electronic device. The optical force sensor may be configured to compensate for variations in temperature using two or more force-sensitive components that are formed from materials having different temperature- and strain-dependent responses.

20 Claims, 9 Drawing Sheets

Related U.S. Application Data continuation of application No. 14/594,779, filed on Jan. 12, 2015, now abandoned.

(60) Provisional application No. 62/024,566, filed on Jul. 15, 2014, provisional application No. 61/942,021, filed on Feb. 19, 2014, provisional application No. 61/939,257, filed on Feb. 12, 2014, provisional application No. 61/937,465, filed on Feb. 7, 2014, provisional application No. 61/926,905, filed on Jan. 13, 2014.

(51) Int. Cl.
*G01L 1/20* (2006.01)
*G06F 3/044* (2006.01)
*G01L 1/16* (2006.01)
*G06F 3/045* (2006.01)
*G01L 1/00* (2006.01)

(52) U.S. Cl.
CPC ............... *G01L 1/20* (2013.01); *G01L 1/205* (2013.01); *G06F 3/044* (2013.01); *G06F 3/045* (2013.01); *G06F 3/0412* (2013.01); *G06F 3/0416* (2013.01); *G06F 2203/04103* (2013.01); *G06F 2203/04105* (2013.01); *G06F 2203/04111* (2013.01)

(58) Field of Classification Search
CPC . G06F 2203/04111; G06F 2203/04103; G06F 2203/04105; G01L 1/005; G01L 1/16; G01L 1/18; G01L 1/205; G01L 1/20
See application file for complete search history.

(56) References Cited

U.S. PATENT DOCUMENTS

| | | | |
|---|---|---|---|
| 3,876,912 A | 4/1975 | Sanders |
| 4,345,477 A | 8/1982 | Johnson |
| 4,423,640 A | 1/1984 | Jetter |
| 4,516,112 A | 5/1985 | Chen |
| 4,634,917 A | 1/1987 | Dvorsky et al. |
| 4,695,963 A | 9/1987 | Sagisawa |
| 4,951,510 A | 8/1990 | Holm-Kennedy et al. |
| 5,481,905 A | 1/1996 | Pratt |
| 5,577,021 A | 11/1996 | Nakatani et al. |
| 5,616,846 A | 4/1997 | Kwasnik |
| 5,673,041 A | 9/1997 | Chatigny et al. |
| 5,708,460 A | 1/1998 | Young |
| 5,790,215 A | 8/1998 | Sugahara |
| 5,844,506 A | 12/1998 | Binstead |
| 5,915,285 A | 6/1999 | Sommer |
| 6,288,829 B1 | 9/2001 | Kimura |
| 6,369,865 B2 | 4/2002 | Hinata |
| 6,386,023 B1 | 4/2002 | Sajna et al. |
| 6,606,087 B1 | 8/2003 | Tomomatsu |
| 6,637,276 B2 | 10/2003 | Adderton et al. |
| 6,778,167 B2 | 8/2004 | Ohashi |
| 6,812,161 B2 | 11/2004 | Heremans |
| 6,973,837 B2 | 12/2005 | Barnett |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,320,253 B2 | 1/2008 | Hanazawa et al. |
| 7,331,245 B2 | 2/2008 | Nishimura |
| 7,392,716 B2 | 7/2008 | Wilner |
| 7,441,467 B2 | 10/2008 | Bloom |
| 7,456,823 B2 | 11/2008 | Poupyrev et al. |
| 7,511,702 B2 | 3/2009 | Hotelling |
| 7,538,760 B2 | 5/2009 | Hotelling et al. |
| 7,707,894 B2 | 5/2010 | Sumigawa |
| 7,724,248 B2 | 5/2010 | Saito |
| 7,726,199 B2 | 6/2010 | Shkel et al. |
| 7,755,616 B2 | 7/2010 | Jung et al. |
| 7,800,592 B2 | 9/2010 | Kerr et al. |
| 7,812,268 B2 | 10/2010 | Ely |
| 7,821,502 B2 | 10/2010 | Hristov |
| 7,903,091 B2 | 3/2011 | Lee |
| 7,992,448 B2 | 8/2011 | Shimazu |
| 8,020,456 B2 | 9/2011 | Liu et al. |
| 8,050,876 B2 | 11/2011 | Feen et al. |
| 8,056,421 B2 | 11/2011 | Sumigawa |
| 8,077,154 B2 | 12/2011 | Emig et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klighhult et al. |
| 8,411,064 B2 | 4/2013 | Noguchi et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,482,545 B2 | 7/2013 | King-Smith et al. |
| 8,519,974 B2 | 8/2013 | Berggren |
| 8,531,429 B2 | 9/2013 | Chang |
| 8,605,053 B2 | 12/2013 | Murphy et al. |
| 8,640,549 B2 | 2/2014 | Inamori |
| 8,648,816 B2 | 2/2014 | Homma et al. |
| 8,669,952 B2 | 3/2014 | Hashimura et al. |
| 8,669,962 B2 | 3/2014 | Kuan |
| 8,681,122 B2 | 3/2014 | Pirogov et al. |
| 8,692,646 B2 | 4/2014 | Lee et al. |
| 8,695,433 B2 | 4/2014 | Shimazu |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,870,087 B2 | 10/2014 | Coogan et al. |
| 8,878,803 B2 | 11/2014 | Kimura et al. |
| 8,952,892 B2 | 2/2015 | Chai |
| 8,982,044 B2 | 3/2015 | Katsurahira |
| 8,982,088 B2 | 3/2015 | Kung |
| 8,988,384 B2 | 3/2015 | Krah |
| 9,001,088 B2 | 4/2015 | Lee et al. |
| 9,007,333 B1 | 4/2015 | Wilson |
| 9,057,653 B2 | 4/2015 | Schediwy |
| 9,024,904 B2 | 5/2015 | Jung et al. |
| 9,024,910 B2 | 5/2015 | Stephanou et al. |
| 9,024,918 B2 | 5/2015 | Cok |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,110,545 B2 | 8/2015 | Radivojevic |
| 9,116,569 B2 | 8/2015 | Stacy et al. |
| 9,116,570 B2 | 8/2015 | Lee et al. |
| 9,128,547 B2 | 9/2015 | Kodani et al. |
| 9,134,826 B2 | 9/2015 | Andoh |
| 9,158,407 B2 | 10/2015 | Coulson |
| 9,182,849 B2 | 11/2015 | Huang et al. |
| 9,182,859 B2 | 11/2015 | Coulson et al. |
| 9,200,970 B2 | 12/2015 | Kodani et al. |
| 9,223,162 B2 | 12/2015 | DeForest et al. |
| 9,223,445 B2 | 12/2015 | Sleeman et al. |
| 9,246,486 B2 | 1/2016 | Yang et al. |
| 9,262,002 B2 | 2/2016 | Momeyer et al. |
| 9,262,003 B2 | 2/2016 | Kitchens |
| 9,292,115 B2 | 3/2016 | Kauhanen |
| 9,304,348 B2 | 4/2016 | Jang |
| 9,304,637 B2 | 4/2016 | Huang |
| 9,329,719 B2 | 5/2016 | Molne et al. |
| 9,342,179 B2 | 5/2016 | Fuji et al. |
| 9,360,977 B2 | 6/2016 | Aberg |
| 9,367,173 B2 | 6/2016 | Setlak |
| 9,383,848 B2 | 7/2016 | Daghigh |
| 9,406,013 B2 | 8/2016 | Suwald |
| 9,415,517 B2 | 8/2016 | Naidu |
| 9,417,696 B2 | 8/2016 | DeLuca |
| 9,417,725 B1 | 8/2016 | Watazu et al. |
| 9,454,268 B2 | 9/2016 | Badaye et al. |
| 9,459,734 B2 | 10/2016 | Day |

(56) References Cited

U.S. PATENT DOCUMENTS

| | | | |
|---|---|---|---|
| 9,466,783 B2 | 10/2016 | Olien et al. |
| 9,471,169 B2 | 10/2016 | Schediwy et al. |
| 9,477,342 B2 | 10/2016 | Daverman et al. |
| 9,501,167 B2 | 11/2016 | Day |
| 9,507,456 B2 | 11/2016 | Watazu et al. |
| 9,519,378 B2 | 12/2016 | Watazu et al. |
| 9,542,028 B2 | 1/2017 | Filiz et al. |
| 9,557,857 B2 | 1/2017 | Schediwy |
| 9,562,814 B2 | 2/2017 | Kulkarni et al. |
| 9,563,317 B2 | 2/2017 | Sleeman et al. |
| 9,612,170 B2 | 4/2017 | Vosgueritchian et al. |
| 9,632,629 B2 | 4/2017 | Prendergast |
| 9,639,224 B2 | 5/2017 | Lee |
| 9,654,883 B2 | 5/2017 | Fuji et al. |
| 9,658,722 B2 | 5/2017 | Schwartz |
| 9,665,197 B2 | 5/2017 | Haffenden et al. |
| 9,665,200 B2 | 5/2017 | Filiz et al. |
| 9,671,918 B2 | 6/2017 | Tsuchihashi et al. |
| 9,690,408 B1 | 6/2017 | Krah |
| 9,690,413 B2 | 6/2017 | Filiz |
| 9,690,414 B2 | 6/2017 | Kano et al. |
| 9,727,157 B2 | 8/2017 | Ham |
| 9,729,730 B2 | 8/2017 | Levesque et al. |
| 9,791,968 B2 | 10/2017 | Yang |
| 9,841,850 B2 | 12/2017 | Schediwy et al. |
| 9,851,843 B2 | 12/2017 | Mishra et al. |
| 9,864,450 B2 | 1/2018 | Watazu et al. |
| 9,881,577 B2 | 1/2018 | Wang et al. |
| 9,916,942 B2 | 3/2018 | Shedletsky |
| 9,965,092 B2 | 5/2018 | Smith |
| 10,007,380 B2 | 6/2018 | Yoon et al. |
| 10,032,592 B2 | 7/2018 | Brooks et al. |
| 10,175,736 B2 | 1/2019 | Kim |
| 10,185,397 B2 | 1/2019 | Yoneoka et al. |
| 2002/0149571 A1 | 10/2002 | Roberts |
| 2006/0043508 A1 | 3/2006 | Ohta et al. |
| 2007/0159561 A1 | 7/2007 | Chien |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0267902 A1 | 10/2009 | Nambu et al. |
| 2009/0309616 A1* | 12/2009 | Klinghult ............. G06F 3/044 324/686 |
| 2009/0316380 A1 | 12/2009 | Armstrong |
| 2010/0103115 A1 | 4/2010 | Hainzl |
| 2010/0117809 A1 | 5/2010 | Dai et al. |
| 2010/0123686 A1* | 5/2010 | Klinghult ............. G06F 3/0412 345/178 |
| 2011/0045285 A1 | 2/2011 | Saiki et al. |
| 2011/0050586 A1* | 3/2011 | Miller ................. G06F 3/0412 345/173 |
| 2011/0248839 A1 | 10/2011 | Kwok et al. |
| 2011/0261021 A1 | 10/2011 | Modarres et al. |
| 2011/0285660 A1 | 11/2011 | Prabhu et al. |
| 2012/0019448 A1 | 1/2012 | Pitkanen et al. |
| 2012/0038577 A1 | 2/2012 | Brown et al. |
| 2012/0075241 A1* | 3/2012 | Bao ..................... H01L 29/84 345/174 |
| 2012/0105367 A1 | 5/2012 | Son et al. |
| 2012/0127136 A1 | 5/2012 | Schneider et al. |
| 2012/0154299 A1 | 6/2012 | Hsu et al. |
| 2012/0188198 A1 | 7/2012 | Jeong et al. |
| 2012/0293491 A1 | 11/2012 | Wang et al. |
| 2013/0009905 A1* | 1/2013 | Castillo ................. G06F 3/044 345/174 |
| 2013/0018489 A1* | 1/2013 | Grunthaner ........... G06F 3/041 700/73 |
| 2013/0074988 A1 | 3/2013 | Chou |
| 2013/0082970 A1 | 4/2013 | Frey et al. |
| 2013/0141365 A1 | 6/2013 | Lynn et al. |
| 2013/0147739 A1 | 6/2013 | Aberg et al. |
| 2013/0154933 A1 | 6/2013 | Sheik-Nainar |
| 2013/0155059 A1 | 6/2013 | Wang et al. |
| 2013/0215056 A1 | 8/2013 | Johansson et al. |
| 2013/0222306 A1 | 8/2013 | Aberg et al. |
| 2013/0328803 A1 | 12/2013 | Fukushima et al. |
| 2013/0333922 A1 | 12/2013 | Kai et al. |
| 2014/0085253 A1 | 3/2014 | Leung et al. |
| 2014/0118635 A1 | 5/2014 | Yang |
| 2014/0191973 A1 | 7/2014 | Zellers et al. |
| 2014/0327847 A1 | 11/2014 | Park et al. |
| 2015/0002452 A1 | 1/2015 | Klinghult |
| 2015/0101849 A1 | 4/2015 | Bockmeyer et al. |
| 2015/0116260 A1 | 4/2015 | Hoen et al. |
| 2015/0242037 A1 | 8/2015 | Pedder et al. |
| 2015/0268725 A1 | 9/2015 | Levesque et al. |
| 2015/0301684 A1 | 10/2015 | Shimamura |
| 2015/0331517 A1 | 11/2015 | Filiz et al. |
| 2015/0338304 A1* | 11/2015 | Prud'homme ......... G01L 25/00 702/98 |
| 2015/0370412 A1 | 12/2015 | Ohba et al. |
| 2016/0003697 A1 | 1/2016 | Okamoto et al. |
| 2016/0011708 A1 | 1/2016 | Chung |
| 2016/0033389 A1 | 2/2016 | Serpe |
| 2016/0034073 A1 | 2/2016 | Andoh |
| 2016/0035290 A1 | 2/2016 | Kim et al. |
| 2016/0041672 A1 | 2/2016 | Hoen et al. |
| 2016/0048266 A1 | 2/2016 | Smith et al. |
| 2016/0062517 A1 | 3/2016 | Meyer et al. |
| 2016/0077649 A1 | 3/2016 | Ando et al. |
| 2016/0117035 A1 | 4/2016 | Watazu et al. |
| 2016/0132151 A1 | 5/2016 | Watazu et al. |
| 2016/0147353 A1 | 5/2016 | Filiz et al. |
| 2016/0306481 A1 | 10/2016 | Filiz et al. |
| 2016/0357297 A1 | 12/2016 | Picciotto et al. |
| 2017/0031495 A1 | 2/2017 | Smith |
| 2017/0068318 A1 | 3/2017 | McClure et al. |
| 2017/0075465 A1 | 3/2017 | Pedder et al. |
| 2017/0090638 A1 | 3/2017 | Vosgueritchian et al. |
| 2017/0090655 A1 | 3/2017 | Zhang et al. |
| 2017/0191884 A1 | 7/2017 | Vosgueritchian et al. |
| 2017/0261387 A1 | 9/2017 | Vosgueritchian et al. |
| 2017/0269757 A1 | 9/2017 | Filiz et al. |
| 2017/0285799 A1 | 10/2017 | Iuchi et al. |
| 2017/0285864 A1 | 10/2017 | Pedder et al. |
| 2018/0059839 A1 | 3/2018 | Kim et al. |
| 2018/0067612 A1 | 3/2018 | Smith |
| 2018/0074638 A1 | 3/2018 | Chiang et al. |
| 2018/0157363 A1 | 6/2018 | Vosgueritchian et al. |
| 2018/0217708 A1 | 8/2018 | Hoen et al. |
| 2018/0292933 A1 | 10/2018 | Hu et al. |
| 2019/0025140 A1 | 1/2019 | Smith |
| 2019/0042046 A1 | 2/2019 | Filiz et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102117158 | 7/2011 |
| CN | 102165400 | 8/2011 |
| CN | 102175362 A | 9/2011 |
| CN | 102308269 | 1/2012 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 103955321 | 7/2014 |
| CN | 204461655 U | 7/2015 |
| CN | 104866134 | 8/2015 |
| CN | 204576454 U | 8/2015 |
| CN | 105444662 | 3/2016 |
| CN | 205068342 | 3/2016 |

(56) References Cited

FOREIGN PATENT DOCUMENTS

| | | |
|---|---|---|
| CN | 105793803 | 7/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 2013503388 | 1/1900 |
| JP | H09511086 | 11/1997 |
| JP | 2008226641 | 9/2008 |
| JP | 201039458 A | 2/2010 |
| JP | 2010197066 | 9/2010 |
| JP | 2011258530 | 12/2011 |
| JP | 2012053646 | 3/2012 |
| JP | 2012517584 | 8/2012 |
| JP | 2014135010 | 7/2014 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 14/016429 | 1/2014 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," SENSOR+TEST Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

\* cited by examiner

TEMPERATURE COMPENSATING FORCE SENSOR

CROSS-REFERENCE TO RELATED APPLICATIONS

This application is a continuation of U.S. patent application Ser. No. 14/729,172, filed Jun. 3, 2015, and titled "Temperature Compensating Transparent Force Sensor," which is a continuation of U.S. patent application Ser. No. 14/594,779, filed Jan. 12, 2015, and titled "Temperature Compensating Transparent Force Sensor," which claims priority to U.S. Provisional Patent Application No. 61/926,905, filed Jan. 13, 2014, and titled "Force Sensor Using a Transparent Force-Sensitive Film," U.S. Provisional Patent Application No. 61/937,465, filed Feb. 7, 2014, and titled "Temperature Compensating Transparent Force Sensor," U.S. Provisional Patent Application No. 61/939,257, filed Feb. 12, 2014, and titled "Temperature Compensating Transparent Force Sensor," U.S. Provisional Patent Application No. 61/942,021, filed Feb. 19, 2014, and titled "Multi-Layer Temperature Compensating Transparent Force Sensor," and U.S. Provisional Patent Application No. 62/024,566, filed Jul. 15, 2014, and titled "Strain-Based Transparent Force Sensor," the disclosure of each of which is incorporated by reference in its entirety.

TECHNICAL FIELD

This application generally relates to force sensing and more specifically to force sensing using a transparent force-sensitive component that is integrated with a display of an electronic device.

BACKGROUND

Many electronic devices include some type of user input device, including, for example, buttons, slides, scroll wheels, and similar devices or user-input elements. Some devices may include a touch sensor that is integrated or incorporated with a display screen. The touch sensor may allow a user to interact directly with user-interface elements that are presented on the display screen. However, some traditional touch sensors may only provide a location of a touch on the device. Other than location of the touch, many traditional touch sensors produce an output that is binary in nature. That is, the touch is present or it is not.

In some cases, it may be advantageous to detect and measure the force of a touch that is applied to a surface to provide non-binary touch input. However, there may be several challenges associated with implementing a force sensor in an electronic device. For example, temperature fluctuations in the device or environment may introduce an unacceptable amount of variability in the force measurements. Additionally, if the force sensor is incorporated with a display or transparent medium, it may be challenging to achieve both sensing performance and optical performance in a compact form factor.

SUMMARY

Embodiments described herein may relate to, include, or take the form of an optically transparent force sensor, which may be used as input to an electronic device. The optically transparent force sensor may be configured to compensate for variations in temperature using two or more force-sensitive components that are formed from materials having different temperature- and strain-dependent responses.

In some example embodiments, a transparent force sensor is configured to detect a force on a surface of a device. The transparent force sensor may include a first transparent force-sensitive component having a first temperature-dependent response, and a second transparent force-sensitive component having a second temperature-dependent response. A sensor circuit may be operatively coupled to the first and second transparent force-sensitive components. The sensor circuit may be configured to detect a change in an electrical property of the first and second transparent force-sensitive components and output a force estimate that compensates for a variation in temperature using the first and second temperature-dependent responses of the first and second transparent force-sensitive components.

In some embodiments, the first transparent force-sensitive component may have a first strain-dependent response and the second transparent force-sensitive component has a second strain-dependent response, and the a strain ratio between the first and second strain-dependent responses is different than a temperature ratio between the first and second temperature-dependent responses. In some embodiments, the sensor circuit is configured to compensate for the variation in temperature using the first strain-dependent response and the first temperature-dependent response of the first transparent force-sensitive component and the second strain-dependent response and the second temperature-based response of the second transparent force-sensitive component. In some cases, the first strain-dependent response is represented by a first strain relationship that is a linear relationship between the strain and the resistance of the first transparent force-sensitive component. In some cases, the second strain-dependent response is represented by a second strain relationship that is a linear relationship between the strain and the resistance of the second transparent force-sensitive component. Similarly, the first temperature-dependent response may represented by a first temperature relationship that is a linear relationship between the temperature and the resistance of the first transparent force-sensitive component, and the second temperature-dependent response may be represented by a second temperature relationship that is a linear relationship between the temperature and the resistance of the second transparent force-sensitive component.

In some embodiments, the surface of the device is a cover disposed over a display of the device, and the force estimate corresponds to the force of a touch on the surface of the cover. In some embodiments, the first transparent force-sensitive component is formed from an indium tin oxide (ITO) material and the second transparent force-sensitive component is formed from a polyethyleneioxythiophene (PEDOT) material. In some cases, the first transparent force-sensitive component is formed from a first type of PEDOT material having the first temperature-dependent response and the second transparent force-sensitive component is formed from a second type of PEDOT material having the second temperature-dependent response. In some cases, the first and second temperature-dependent responses are different from each other.

Some example embodiments are directed to an electronic device having a transparent force sensor. The device may include an enclosure, a display disposed within the enclosure, and a cover disposed above the display and forming a portion of an outer surface or the device. The device may also include a first array of transparent force-sensitive components disposed below the cover and having a first temperature-dependent response. A second array of transparent force-sensitive components may be disposed below the first array and have a second temperature-dependent response. The device may also include a sensor circuit that is operatively coupled to the first and second array, configured to detect a change in an electrical property of components the first and second arrays, and output a force estimate that compensates for a variation in temperature using the first and second temperature-dependent responses of the first and second transparent force-sensitive components. In some implementations, the display is disposed between the cover and the first array of transparent force-sensitive components. In some implementations, the display is disposed below the first array of transparent force-sensitive components. In some implementations, a pressure-sensitive adhesive layer may be disposed between the first array and the cover, wherein the pressure-sensitive adhesive layer has an elasticity of approximately 1 MPa.

In some embodiments, the first array of transparent force-sensitive components has a first strain-dependent response and the second array of transparent force-sensitive components has a second strain-dependent response, and the a strain ratio between the first and second strain-dependent responses is different than a temperature ratio between the first and second temperature-dependent responses.

Some example embodiments include a third array of transparent force-sensitive components that may be disposed between the first array and the second array and have the first temperature-dependent response. Some example embodiments include a fourth array of transparent force-sensitive components disposed between the third array and the second array and having the second temperature-dependent response.

Some example embodiments are directed to an electronic device having a transparent force sensor. The device may include an enclosure, a display disposed within the enclosure and a cover disposed above the display and forming a portion of an outer surface or the device. The device may also include a first array of transparent force-sensitive components disposed below the cover and including components having a first and second temperature-dependent response. A second array of transparent force-sensitive components may be disposed below the first array and include components having a first and second temperature-dependent response. A sensor circuit may be operatively coupled to the first and second array, configured to detect a change in an electrical property of components, and output a force estimate that compensates for a variation in temperature using the first and second temperature-dependent responses.

In some example embodiments, the first array of transparent force-components includes alternating structures formed from an indium tin oxide material and a PEDOT material. In some embodiments, the first array of transparent force-components includes alternating structures formed from a first type of PEDOT material having the first temperature-dependent response and a second type of PEDOT material having the second temperature-dependent response.

Some example embodiments are directed to a transparent force sensor for detecting a force on a surface of a device. The transparent force sensor may include a transparent force-sensitive component including an array of pixel elements. The array of pixel elements may include a primary pixel and at least one reference pixel. The at least on reference pixel may be separated by the primary pixel by at least one other pixel element. A sensor circuit may be configured to form an electrical bridge circuit across the primary pixel and the at least one reference pixel to detect a change in resistance of the primary pixel. In some embodiments, the at least one reference pixel and the primary pixel are subjected to similar thermal conditions and are subjected to different strain conditions when the force is applied to the surface of the device. In some cases, the at least one reference pixel is formed on a different layer than the primary pixel.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

DETAILED DESCRIPTION

Figure 1:
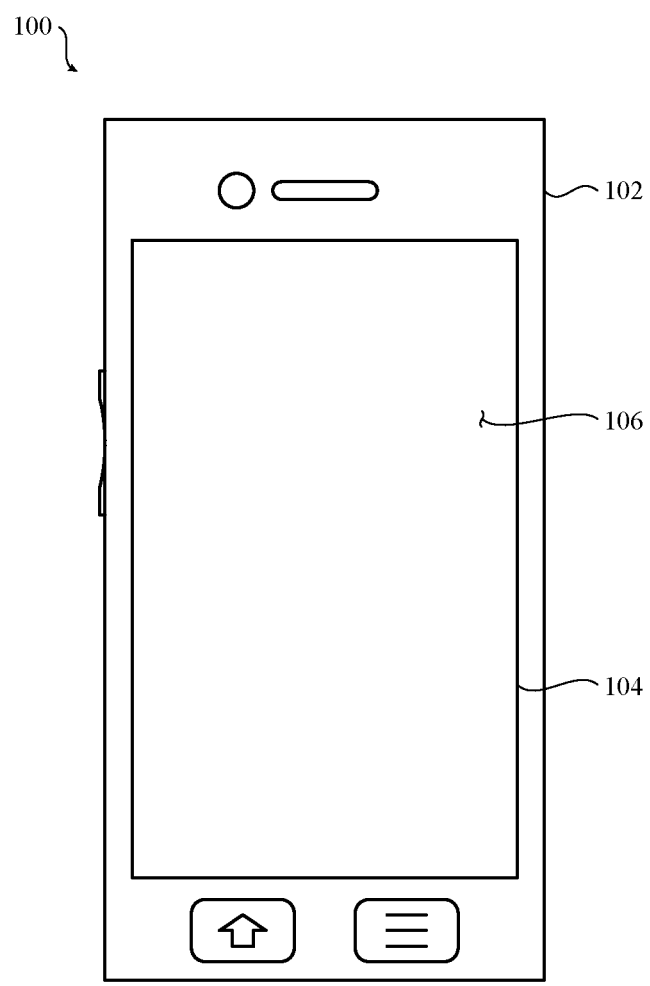
FIG. 1 depicts an example electronic device.

In the following description of examples, reference is made to the accompanying drawings in which it is shown by way of illustration specific examples that can be practiced. It is to be understood that other examples can be used and structural changes can be made without departing from the scope of the various examples.

Embodiments described herein may relate to or take the form of a force sensor that is incorporated with components of an electronic device to form a touch-sensitive surface on the device. Some embodiments are directed to a force sensor that can compensate for variations in temperature and may be optically transparent for integration with a display or transparent medium of an electronic device. Certain embodiments described herein also relate to force-sensitive structures including one or more force-sensitive components for detecting a magnitude of a force applied to a device. In one example, a transparent force-sensitive component is integrated with, or adjacent to, a display element of an electronic device. The electronic device may be, for example, a mobile phone, a tablet computing device, a computer display, a notebook computing device, a desktop computing device, a computing input device (such as a touch pad, keyboard, or mouse), a wearable device, a health monitor device, a sports accessory device, and so on.

Generally and broadly, a user touch event may be sensed on a display, enclosure, or other surface associated with an electronic device using a force sensor adapted to determine the magnitude of force of the touch event. The determined magnitude of force may be used as an input signal, input data, or other input information to the electronic device. In one example, a high force input event may be interpreted differently from a low force input event. For example, a smart phone may unlock a display screen with a high force input event and may pause audio output for a low force input event. The device's responses or outputs may thus differ in response to the two inputs, even though they occur at the same point and may use the same input device. In further examples, a change in force may be interpreted as an additional type of input event. For example, a user may hold a wearable device force sensor proximate to an artery in order to evaluate blood pressure or heart rate. One may appreciate that a force sensor may be used for collecting a variety of user inputs.

In many examples, a force sensor may be incorporated into a touch-sensitive electronic device and located proximate to a display of the device, or incorporated into a display stack. Accordingly, in some embodiments, the force sensor may be constructed of optically transparent materials. For example, an optically transparent force sensor may include at least a force-receiving layer, at least one substrate each including formed form an optically transparent material. The sensor may also include one or more force-sensitive components disposed on the substrate. In some embodiments, the substrate may be disposed below the force-receiving layer such that the force-sensitive component may experience deflection, tension, compression, or another mechanical deformation upon application of force to the force-receiving layer.

A transparent force-sensitive component may be formed from a compliant material that exhibits at least one measurable electrical response that varies with a deformation, deflection, or shearing of the component. The transparent force-sensitive component may be formed from a piezoelectric, piezoresistive, resistive, or other strain-sensitive material that is attached to or formed on a substrate and electrically or operatively coupled to sensor circuitry for measuring a change in the electrical response of the material. Potential substrate materials include, for example, glass or transparent polymers like polyethylene terephthalate (PET) or cyclo-olefin polymer (COP). Example transparent conductive materials include polyethyleneioxythiophene (PEDOT), indium tin oxide (ITO), carbon nanotubes, graphene, piezoresistive semiconductor materials, piezoresistive metal materials, silver nanowire, other metallic nanowires, and the like. Transparent materials may be used in sensors that are integrated or incorporated with a display or other visual element of a device. If transparency is not required, then other component materials may be used, including, for example, Constantan and Karma alloys for the conductive component and a polyimide may be used as a substrate. Nontransparent applications include force sensing on track pads or behind display elements. In general, transparent and non-transparent force-sensitive components may be referred to herein as "force-sensitive components" or simply "components."

In some cases, the force-sensitive component may be placed under tension in response to a downward deflection because the component is positioned below the neutral axis of the bend of the substrate. Once under tension, the transparent force-sensitive component may exhibit a change in at least one electrical property, for example, resistance. In one example, the resistance of the transparent force-sensitive component may increase linearly with an increase in tension experienced by the component. In another example, the resistance of the transparent force-sensitive component may decrease linearly with an increase in tension experienced by the component. One may appreciate that different transparent materials may experience different changes to different electrical properties, and as such, the effects of tension may vary from embodiment to embodiment.

In some embodiments, the force-sensitive component is patterned into an array of lines, pixels, or other geometric elements herein referred to as "components." The regions of the force-sensitive component or the components may also be connected to sense circuitry using electrically conductive traces or electrodes. In some cases, the conductive traces or electrodes are also formed from transparent conductive materials. In some embodiments, sense circuitry may be in electrical communication with the one or more components via the electrically conductive traces and/or the electrodes. As previously mentioned, the sense circuitry may be adapted to detect and measure the change in the electrical property or response (e.g., resistance) of the component due to the force applied.

In some cases, the force-sensitive components may be patterned into pixel elements, each pixel element including an array of traces generally oriented along one direction. This configuration may be referred to as a piezoresistive or resistive strain gauge configuration. In general, in this configuration the force-sensitive-component may be composed of a material whose resistance changes in a known fashion in response to strain. For example, some materials may exhibit a change in resistance linearly in response to strain. Some materials may exhibit a change in resistance logarithmically or exponentially in response to strain. Some materials may exhibit a change in resistance in a different manner. For example, the change in resistance may be due to a change in the geometry resulting from the applied strain such as an increase in length combined with decrease in cross-sectional area may occur in accordance with Poisson's effect. The change in resistance may also be due to a change in the inherent resistivity of the material due to the applied strain.

In some embodiments, the force-sensitive component may be formed from a solid sheet of material and is in electrical communication with a pattern of electrodes disposed on one or more surfaces of the force-sensitive component. The electrodes may be used, for example, to electrically connect a region of the solid sheet of material to sense circuitry. This configuration may be referred to as a piezoelectric-strain configuration. In this configuration, the force-sensitive component may generate a charge when strained. The force-sensitive component may also generate different amounts of charge depending on the degree of the strain. In some cases, the overall total charge is a superposition of the charge generated due to strain along various axes.

One or more force-sensitive components may be integrated or incorporated with a display element of a device, which may include other types of sensors. In one typical embodiment, the display element also includes a touch sensor configured to detect the location of one or more touches. A sample touch sensor is described in more detail below with respect to FIG. 11. Using a touch sensor and the transparent force-sensitive component in accordance with some embodiments described herein, the location and magnitude of a touch on a display element of a device can be estimated.

Some embodiments discussed herein are directed to various aspects of detecting force using a force-sensitive component. In one embodiment, two types of force-sensitive materials can be used to reduce or eliminate the effects due to changes in environmental conditions, such as temperature. In another embodiment, one or more reference pixels can be used to improve the measurement sensitivity of device having an array of force-sensitive components. Certain embodiments may include a pressure sensitive adhesive layer affixing various layers of the embodiment together, or affixing the embodiment to another portion of an electronic device, such as to or within a display or display stack. In such embodiments, the pressure-sensitive adhesive layer may be selected at least partially for mechanical properties that provide a desirable deflection in a force-sensitive layer. As an example, the force-sensitive component may be positioned beneath a cover glass but above an LCD layer. Since the force-sensitive component, including the individual force-sensing elements, are generally transparent, a user may see the display through the force-sensitive component even though the component is interposed between the user and display. In another example, the force-sensitive component may be positioned between a light controlling layer of an LCD and a backlight source, and therefore should be substantially transparent to allow light produced by the backlight to reach the light controlling layer. Each of these embodiments can be implemented separately or used in combination with each other, as required or desirable in a particular force-sensing configuration.

In general, the amount of force produced by a touch can be estimated using a force-sensitive component integrated into a device. In one typical embodiment, the force-sensitive component is integrated with, or placed adjacent to, portions of a display element of a device, herein referred to as a "display stack" or simply a "stack." A force-sensitive component may be integrated with a display stack, by, for example, being attached to a substrate or sheet that is attached to the display stack. Alternatively, the force-sensitive component may be placed within the display stack in certain embodiments. Examples of a force-sensitive component that is integrated with a display stack are provided below, with respect to FIGS. 2-8. Although the following examples are provided with respect to force-sensitive component integrated with a display stack, in other embodiments, the force-sensitive component may be integrated in a portion of the device other than the display stack.

As mentioned previously, the force-sensitive component is configured to produce a measureable change in one or more electrical properties in response to a deflection of the force-sensitive component. For example, the force-sensitive component may produce a change in impedance or resistance in response to a deflection. This type of implementation may also be referred to as a strain-gauge component. The force-sensitive component may also or alternatively produce a current or charge in response to a deflection. This type of implementation may also be referred to as a strain-sensitive thin component transistor or piezoelectric component.

One challenge with using a force-sensitive component is that a given electrical property may change in response to variable environmental conditions, such as a change in temperature. In one example, an increase in temperature results in a thermal expansion of the force-sensitive component, which changes the electrical property that may be measured by the sense circuitry. An increase in temperature may occur, for example, as a result of heat produced by the display element or other electronic elements of the device. Similarly, the temperature of the force-sensitive component may decrease due to a decrease in the temperature of the ambient conditions resulting in thermal contraction of the force-sensitive component. Heating or cooling may also occur as a result of a touch if, for example, the touch is performed with a finger that is a different temperature than the force-sensitive component. The force-sensitive component may also expand and contract in response to changes in other environmental conditions, such as changes in humidity. In the following examples, the electrical property is a resistance and the variable environmental condition is temperature. However, the techniques can also be applied to different electrical properties, such as capacitance, that may be affected by changes in other environmental conditions.

Based on a measurement of the electrical property alone, it may be difficult to distinguish a change in an electrical property due to changing environmental condition and a change due to a deflection produced by the force of a touch. For example, a deflection may produce a reduction or increase in the resistance or impedance of the force-sensitive component depending on the type of material that is used and the mechanical nature of the deflection (e.g., compression or expansion). A thermal gradient may also produce a reduction or increase in the resistance or impedance of the force-sensitive component depending on whether the gradient is positive or negative. As a result, the two effects may cancel each other out or amplify each other resulting in an insensitive or hypersensitive force sensor. A similar reduction or increase in the resistance or impedance of the force-sensitive component could also be produced by, for example, an increase in temperature of the force-sensitive component due to heat produced by other elements of the device. Generally, compression or tension of the force-sensing elements defined on the substrate of the force-sensing component creates strain on the force-sensing elements. This strain may cause a change in resistance, impedance, current or voltage that may be measured by associated sense circuitry; the change may be correlated to an amount of force that caused the strain. Accordingly, in some embodiments the force-sensing elements on the component may be considered or otherwise operate as strain gages.

One solution to this problem is to use more than type of force-sensitive component, each type of force-sensitive component having a different sensitivity to a specific environmental condition. In one example, two different force-sensitive components are used, each component having a different sensitivity to temperature changes but similar sensitivity to strain. Knowing or characterizing each of the component's tendency to change a given material property (e.g., resistance), a comparative measurement can be computed that reduces or substantially eliminates the effect of temperature on the force estimation.

In some cases, it may be advantageous that the two different force-sensitive components are integrated in to the device in proximate location such that a deflection produced by a touch force results in approximately the same deflection in each of the force-sensitive components.

In one sample embodiment, two different force-sensitive components are in electrical communication with sense circuitry that is configured to measure an electrical property (e.g., resistance) of each of the force-sensitive components. In this example, the two different force-sensitive components have different temperature and/or strain sensitivities. If the both the temperature and strain characteristics of the force-sensitive components are known, the sense circuitry may be configured to compensate a measurement of the electrical property for changes in temperature.

In one example, the temperature characteristics (e.g., the temperature-dependent response) of the force-sensitive components can be approximated as a linear relationship. Similarly, the strain characteristics (e.g., the strain-dependent response) of the force-sensitive components can also be approximated as a linear relationship. For example, the resistance $R_1$ of a first force-sensitive component can be expressed as:

$$R_1 = A_1 * \varepsilon + B_1 * T, \qquad \text{Equation 1}$$

where $A_1$ is a constant representing the change in resistivity with strain $\varepsilon$, and $B_1$ is a constant representing the change in resistivity with temperature T for the first force-sensitive component. Similarly, the resistance $R_2$ of a second force-sensitive component can be expressed as:

$$R_2 = A_2 * \varepsilon + B_2 * T, \qquad \text{Equation 2}$$

where $A_2$ is a constant representing the change in resistivity with strain $\varepsilon$, and $B_2$ is a constant representing the change in resistivity with temperature T for the second force-sensitive component. If the ratio of $A_1$ to $A_2$ is not equal to the ratio of $B_1$ to $B_2$, then equations 1 and 2 are not degenerate and a unique solution for the strain E can be determined. In this case, a compensation due to temperature can be computed or determined based on the known temperature and strain characteristics of both force-sensitive components (using, for example, sense circuitry).

In some cases, a component's strain characteristic (or strain-based response) and a component's temperature characteristic (or temperature-based response) can be determined by a calibration of the component under certain operating conditions. For example, the calibration may characterize the component measuring different forces produced by multiple touches, while the device is maintained at a near-constant temperature. A different calibration may also characterize the component by measuring the same force (or strain) on the device produced by multiple touches but at different component temperatures. Using the known temperature and strain characteristics of the component and the superposition principle, a component's response to strain and temperature can be differentiated.

FIG. 1 depicts an example electronic device 100 that may include a force sensor in accordance with some embodiments. The electronic device 100 may include a display 104 disposed or positioned within an enclosure 102. The display 104 may include a stack of multiple elements including, for example, a display element, a touch sensor layer, a force sensor layer, and other elements. The display 104 may include a liquid-crystal display (LCD) element, organic light emitting diode (OLED) element, electroluminescent display (ELD), and the like. The display 104 may also include other layers for improving the structural or optical performance of the display, including, for example, glass sheets, polymer sheets, polarizer sheets, color masks, and the like. The display 104 may also be integrated or incorporated with a cover 106, which forms part of the exterior surface of the device 100. Example display stacks depicting some example layer elements are described in more detail below with respect to FIGS. 2-8.

In some embodiments, a touch sensor and or a force sensor are integrated or incorporated with the display 104. In some embodiments, the touch and/or force sensor enable a touch-sensitive surface on the device 100. In the present example, a touch and/or force sensor are used to form a touch-sensitive surface over at least a portion of the exterior surface of the cover 106. The touch sensor may include, for example, a capacitive touch sensor, a resistive touch sensor, or other device that is configured to detect the occurrence and/or location of a touch on the cover 106. The force sensor may include a strain-based force sensor similar to the force sensors described herein.

Figure 2A:
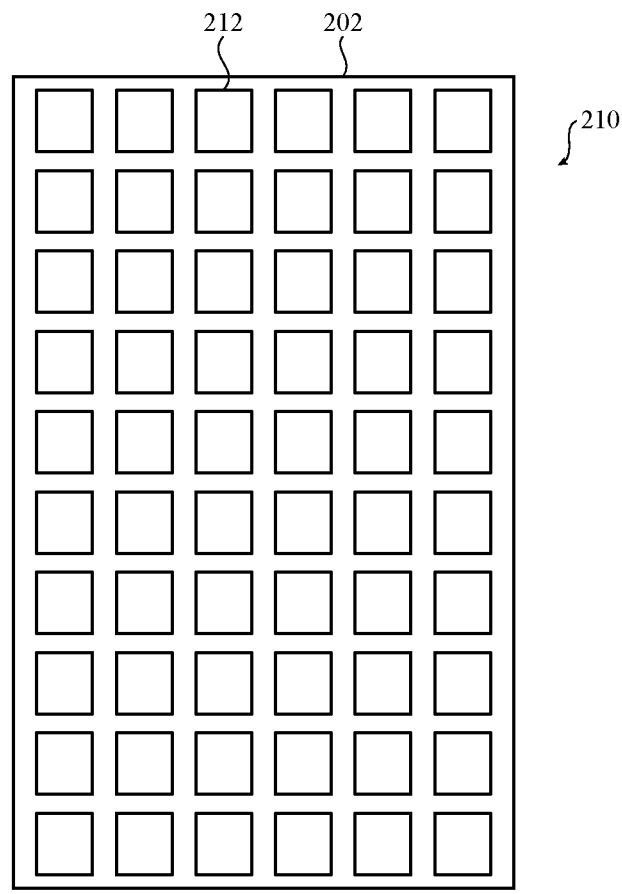
FIG. 2A depicts a top view of an example of an force-sensitive structure including two force-sensitive components.
Figure 2B:
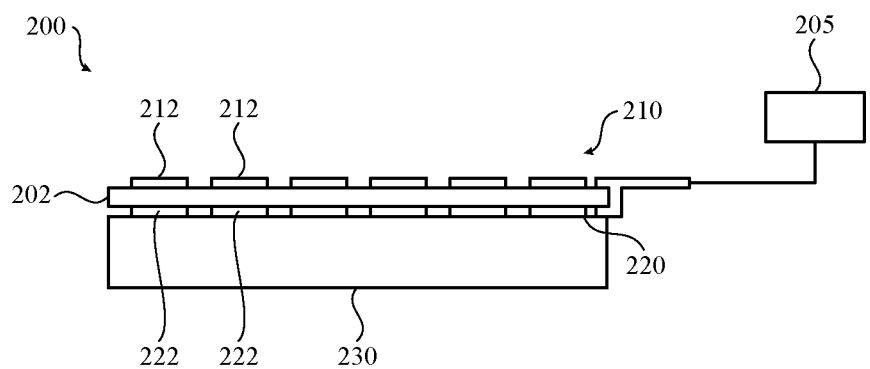
FIG. 2B depicts a side view of an example of an force-sensitive structure including two force-sensitive components.

In some embodiments, each of the layers of the display 104 may be adhered together with an optically transparent adhesive. In other embodiments, each of the layers of the display 104 may be attached or deposited onto separate substrates that may be laminated or bonded to each other. The display 104 may also include other layers for improving the structural or optical performance of the display, including, for example, glass sheets, polarizer sheets, color masks, and the like FIGS. 2A-B depict example configurations using two force-sensitive components. FIG. 2 depicts a stackup 200 including two force-sensitive component layers 210, 220 disposed on either side of a substrate 202. In this example, the substrate 202 is an optically translucent material, such as polyethylene terephthalate (PET). As shown in FIG. 2A, a first force-sensitive component layer 210 is formed from an array of components 212 and disposed on a first side of the substrate 202. Similarly, a second force-sensitive layer 220 is also formed from an array of components 222 and disposed on a second side of the substrate 202 that is opposite to the first side. In this example, the force-sensing components 212, 222 are formed as an array of rectilinear pixel elements, although other shapes and array patterns could also be used.

The components 212, 222 are typically connected to sense circuitry 205 that is configured to detect changes in an electrical property of each of the components 212, 222. In this example, the sense circuitry 205 is configured to detect changes in the resistance of the component 212, 222, which can be used to estimate a force that is applied to the device (e.g., to an element above the stack depicted in FIG. 2B). In some cases, the sense circuitry 205 may also be configured to provide information about the location of the touch based on the relative difference in the change of resistance of the components 212, 222.

In some embodiments, the sense circuitry 205 includes a computer processing unit and computer memory that are configured to execute computer-readable instructions. For example, the sense circuitry 205 may include circuitry that is configured to measure an electrical response of the components 212, 222 (e.g., a resistance, charge, voltage, current) due to the force of a touch on the sensor and/or a change in temperature. As discussed previously, the components 212, 222 may have different temperature and/or strain sensitivities. If the both the temperature and strain characteristics of the force-sensitive components are known and are unique, the sense circuitry 205 may be configured to compensate a measurement of the electrical property for changes in temperature. In some instances, the sense circuitry 205 may be configured to compensate for variations in temperature using, for example, the relationships described above with respect to Equations 1 and 2. The temperature-compensation may be performed using, for example, a combination of electrical (measurement) circuitry and computer-executable code stored in the computer-readable memory and executed by the computer processor.

The first and second force-sensitive components 210, 220 may be disposed on the substrate 202 using a pressure-sensitive adhesive (PSA) layer. The component may also be directly deposited on the substrate 202. In some embodiments, each of the components are attached or deposited onto separate substrates that may be laminated or bonded to each other. In some embodiments, the first and second force-sensitive layers 210, 220 and the substrate 202 are attached or integrated with other elements of a display stack 230. The display stack 230 may include a liquid crystal display (LCD), light-emitting diode (LED), organic light emitting diode (OLED) display, or other display element. The display stack 230 may also include other layers for improving the structural or optical performance of the display, including, for example, a cover glass sheet, polarizer sheets, color masks, and the like. Additionally, the display stack 230 may include a touch sensor for determining the location of one or more touches on the display. A sample touch sensor is described below with respect to FIG. 11.

As described previously, it may be advantageous to form the first force-sensitive layer 210 and the second force-sensitive layer 220 from two different materials, each having a different sensitivity to an environmental condition. For example, the first force-sensitive layer 210 may be formed from a PEDOT material having a first temperature sensitivity (e.g., temperature-based response) and the second force-sensitive layer 220 may be formed from an ITO material having a second temperature sensitivity (e.g., temperature-based response). In some cases, the first and second force-sensitive layers 210, 220 are both formed from a PEDOT material, but have different temperature sensitivities. For example, the first and second force-sensitive layers 210, 220 may be formed from two different materials having different PEDOT:SS ratios. In other cases, the first and second force-sensitive layers 210, 220 may be the same material, but treated chemically to change the strain or temperature-based response. For example, a PEDOT material may be chemically treated with dimethyl sulfoxide (DMSO).

In general, it may be desirable to obtain or calculate the relationship between the temperature of the component and the electrical property (e.g., resistance) and for both of the force-sensitive components. It may also be desirable to obtain or calculate the relationship between strain and the electrical property (e.g., resistance) and for both of the force-sensitive components. In accordance with the technique described above, knowing both the temperature characteristics (e.g., temperature response) and strain characteristics (e.g., strain response) for both of the force-sensitive components, the effects of temperature changes on the force sensor can be reduced or eliminated. In some cases, the known temperature characteristics and strain characteristics can be used to calculate or determine a compensation for the effects of temperature on force measurements performed using the stack 200.

Figure 3A:
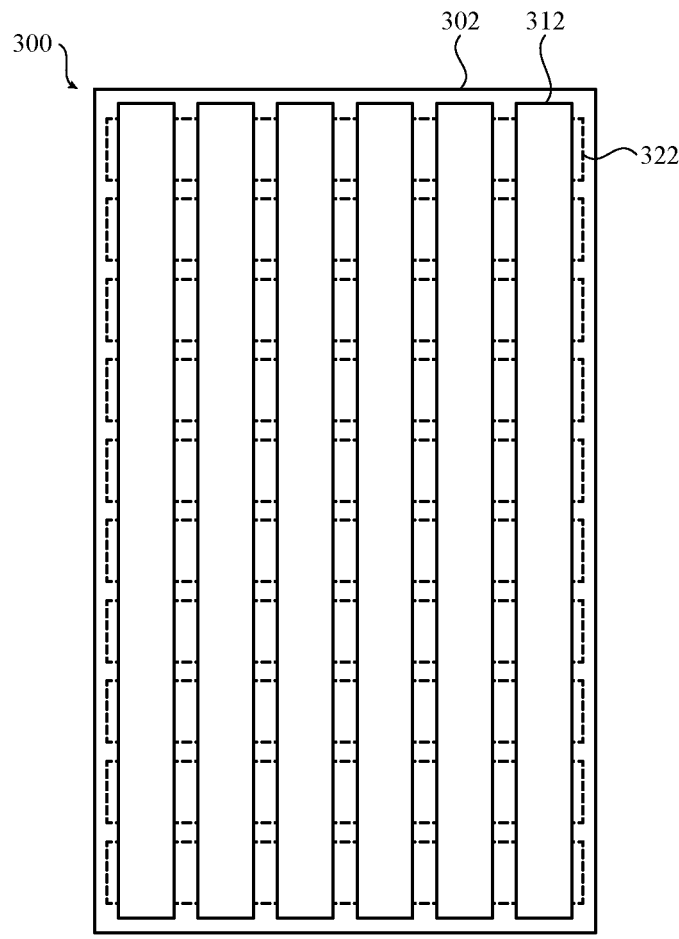
FIG. 3A depicts a top view of another example of a force-sensitive structure including multiple force-sensitive components.
Figure 3B:
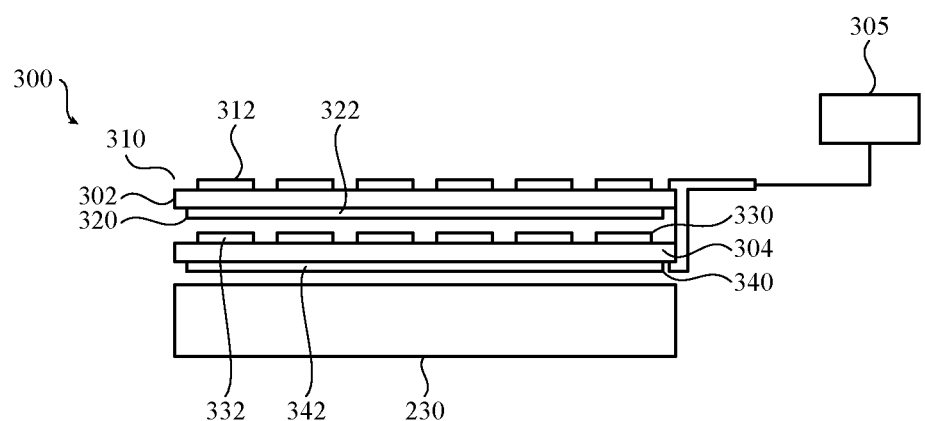
FIG. 3B depicts a side view of another example of a force-sensitive structure including multiple force-sensitive components.

FIGS. 3A-B depicts another example configuration using two types of force-sensitive components. In particular, FIGS. 3A-B depict a stackup 300 including two force-sensitive component layers 310, 320 of a first type disposed on either side of a first substrate 302 and two force-sensitive component layers 330, 340 of a second type disposed on either side of a second substrate 304. In this example, the force-sensitive components are formed from an array of rectilinear strip elements 312, 322, 332, 342 that are located along either the X or Y directions with respect to a plane. The strip elements are arranged transverse (e.g., perpendicular to) each other to form a sensor grid. Similar to the example described above with respect to FIGS. 2A-B, each of the strip elements 312, 322, 332, 342 are electrically connected to sense circuitry 305 that is configured to detect and measure changes to an electrical property that can be used to estimate a force that is applied to the device. In some cases, the sense circuitry 305 can also be used to provide an estimate of the location of the touch on the device. Similar to the example in FIGS. 2A-B, the stackup 300 may be integrated with a display stack 330 having a display element.

In this example, the two force-sensitive layers 310, 320 are formed from a first material having first sensitivity to an environmental condition. For example, the two force-sensitive layers 310, 320 may be formed from a PEDOT material having a first sensitivity to temperature. Similarly, the other two force-sensitive layers 330, 340 may be formed from a second material having a second sensitivity to an environmental condition. For example, the two force-sensitive layers 330, 340 may be formed from another type of PEDOT material or an ITO having a second sensitivity to temperature. Similar to as described above with respect to FIGS. 2A-B, if temperature and strain characteristics are known for both of the force-sensitive component layers 330, 340, the effects of temperature changes on the force sensor can be reduced or eliminated. In some cases, the known temperature characteristics and strain characteristics can be used to calculate or determine a compensation for the effects of temperature on force measurements performed using the stack 300.

Figure 4:
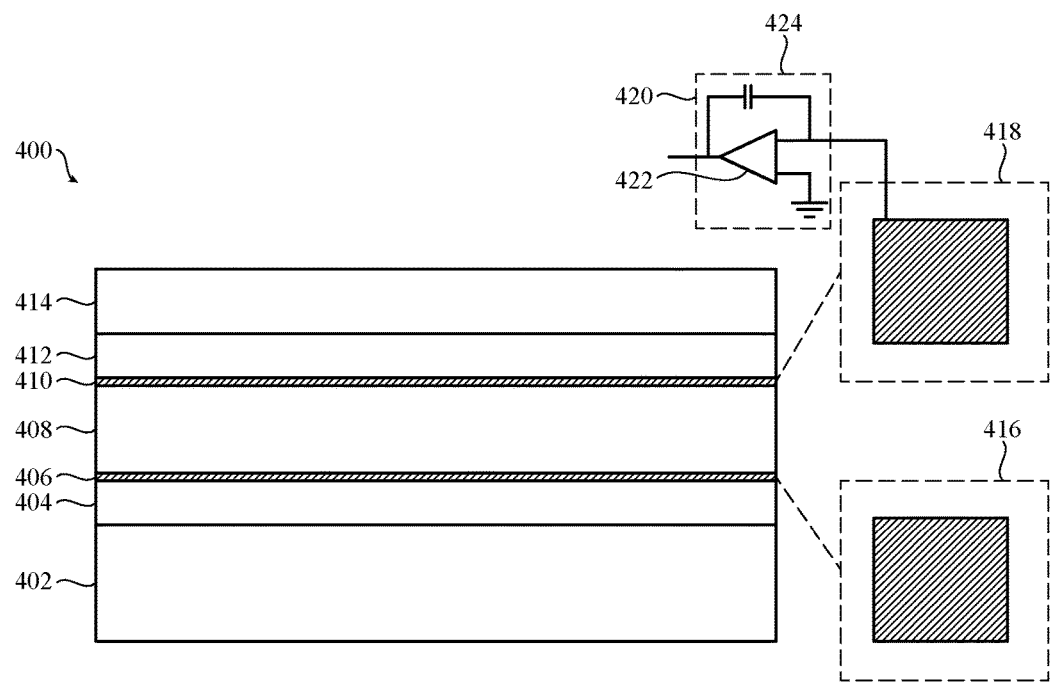
FIG. 4 depicts another example of a force-sensitive structure including a force-sensitive component and associated sense circuitry.
Figure 5:
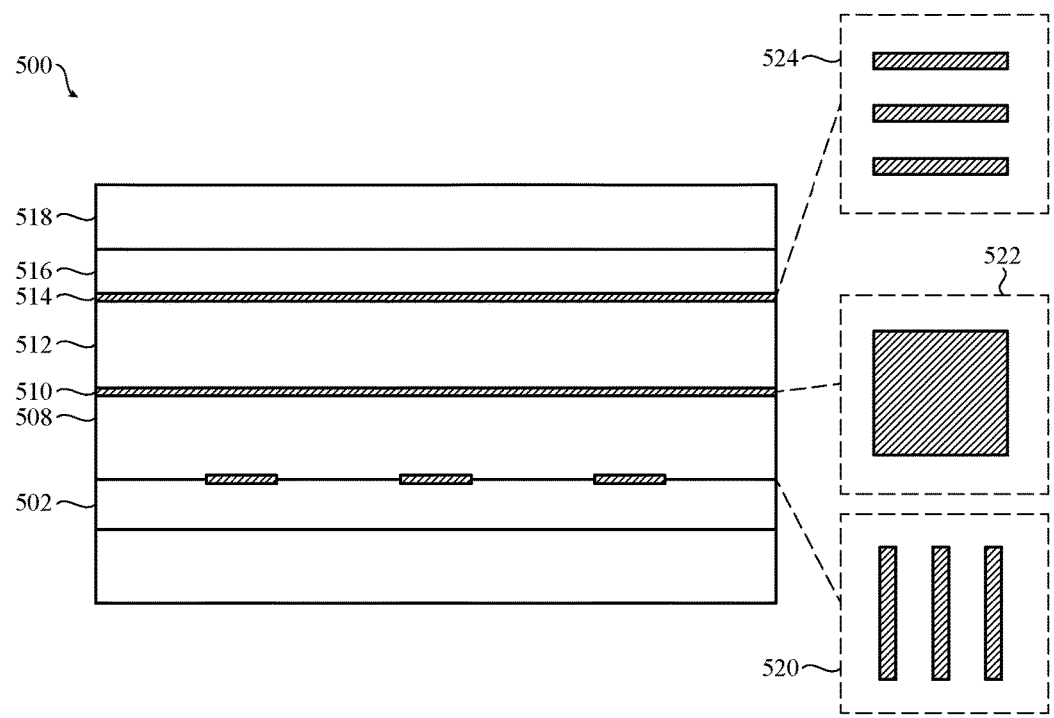
FIG. 5 depicts another example of a force-sensitive structure including a force-sensitive component.

FIGS. 4 and 5 depict two additional example structures for a stackup having a force-sensitive component. FIG. 4 depicts a single force-sensitive component that is integrated in a device. More specifically, FIG. 4 depicts a cross-sectional view of a piezoelectric component integrated into a sample stackup 400 including a display element of a device. Stackup 400 can include a display 402, such as an LCD display, LED display, OLED display, or the like, for generating images to be displayed by the device. Stackup 400 can further include a piezoelectric component 408 coupled to display 402 by optically clear adhesive 404. Piezoelectric component 408 is typically characterized as having an electrical property that changes as the piezoelectric component 408 is deflected or deformed. As depicted in FIG. 4, the piezoelectric component 408 can further include a first set of electrodes 406 and a second set of electrodes 410 formed on opposite surfaces of the component. The electrodes are used to connect portions of the piezoelectric component 408 with other elements of the system, including the sense circuitry 420. A set of electrodes can include a single electrode or multiple electrodes. The electrodes can be formed from a transparent conductive material, such as ITO, PEDOT, or silver nanowire. Top views 416 and 418 show the shapes of any single one of electrodes 406 and 410, respectively, as viewed from above stackup 400. In the illustrated example, electrodes 406 and 410 can both have a shape that substantially matches that of piezoelectric component 408 and display 402 and can extend along the surfaces of piezoelectric component 408.

In some examples, electrode 406 can be coupled to ground and electrode 410 can be coupled to sense circuitry 420 capable of detecting an amount of electric charge generated by piezoelectric component 408. Sense circuitry 420 can include an amplifier 422 and capacitor 424, as shown in FIG. 4, or it can include other circuit elements and components that are configured to detect the electrical response of the piezoelectric component 408 when it experiences strain. In other cases, the piezoelectric component 408 may be electrically connected to the sense circuitry 420 without the use of electrodes. For example, the piezoelectric component 408 may be connected to the sense circuitry 420 using conductive traces that are formed as part of the piezoelectric component layer.

With reference to FIG. 4, the stackup 400 can further include cover material 414 (e.g., glass, plastic, or other rigid and transparent material) coupled to piezoelectric component 408 by optically clear adhesive 412. Since the materials above display 402 can be formed from transparent materials, images generated by display 402 can be viewed through the various layers of stackup 400.

During operation, as a user applies a downward force on cover material 414, cover material 414 can deform by an amount corresponding to an amount of the applied force. The deformation of cover material 414 can cause a corresponding deformation in optically clear adhesive 412 and piezoelectric component 408. The piezoelectric component 408 may then exhibit a change in an electrical property and/or produce an electrical response due to the deformation.

For example, the piezoelectric component 408 may generate an electric charge based on the amount of deformation of the component. In this case, the generated electric charge may be received by sense circuitry 420 via electrode 410. Since the amount of electric charge generated by piezoelectric component 408 may correspond to the amount of deformation of the component and because the amount of deformation of the component may correspond to the force applied to cover material 414, the amount of electric charge detected by sense circuitry 420 may be indicative of the magnitude of the force applied to cover material 414.

In some embodiments, the component 408 may be formed from a material that changes resistance due to deformation caused by the downward force on the cover material 414. Since change in resistance of the component 408 may correspond to the amount of deformation of the component and because the amount of deformation of the component 408 may correspond to the force applied to cover material 414, a change in impedance detected by sense circuitry 420 may be indicative of the magnitude of the force applied to cover material 414. Thus, the sense circuitry 420 may be configured to detect a change in charge and/or resistance, which may be used to compute or estimate an amount of force applied to cover material 414.

FIG. 5 depicts more than one force-sensitive component integrated into a device. In particular, FIG. 5 depicts a cross-sectional view of a sample stackup 500 having two strain-sensitive components integrated into a device. The stackup 500 may be used, for example, to compensate for changes in the temperature of the piezoelectric components. Stackup 500 can also include a display 502, such as an LCD, LED display, OLED display, or the like, for generating images to be displayed by the device. Stackup 500 can further include a first strain-sensitive component 508 coupled to display 502 by optically clear adhesive 504. Stackup 500 can further include a second strain-sensitive component 512 coupled to first strain-sensitive component 508. As discussed above, it may be advantageous that the first strain-sensitive component 508 and the second strain-sensitive component 512 have different sensitivities to an environmental condition, such as temperature.

In one example, the first and second strain-sensitive components 508 and 512 can both include a transparent component capable of generating a change in resistance or charge in response to a deformation of the component. In another example, the first and second strain-sensitive components 508 and 512 may change impedance due to deformation caused by the downward force. Similar to as described above with respect to FIG. 4, the sense circuitry 520 can be used to detect and measure changes in an electrical property of the components. The changes in the electrical property can be used to calculate and estimate of the force that is applied to the device.

Similar to as described above, if temperature and strain characteristics are known for both of the force-sensitive component layers 508, 512, the effects of temperature changes on the force sensor can be reduced or eliminated. In some cases, the known temperature characteristics and strain characteristics can be used to calculate or determine a compensation for the effects of temperature on force measurements performed using the stack 500.

Figure 6:
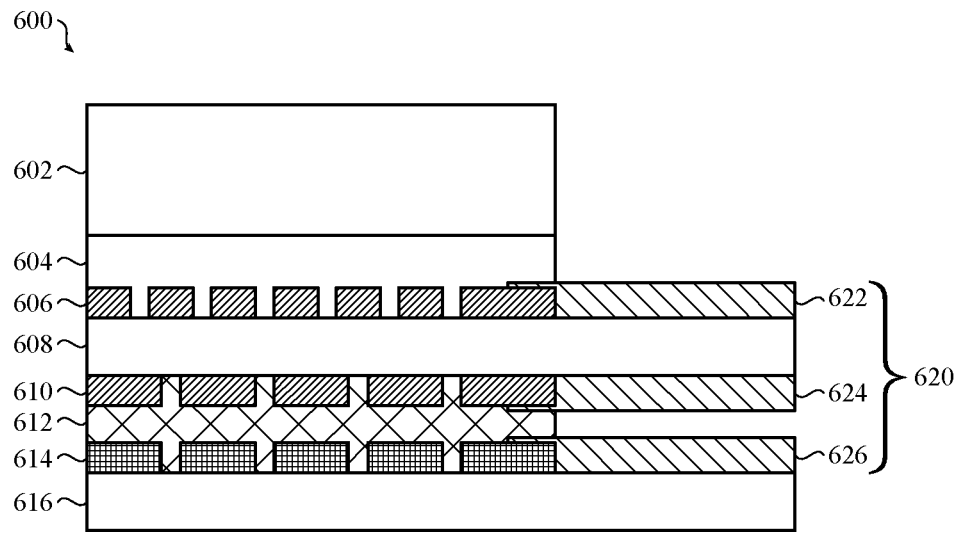
FIGS. 6 and 7 depict example configurations of force-sensitive structures having three force-sensitive component layers on two substrates.
Figure 7:
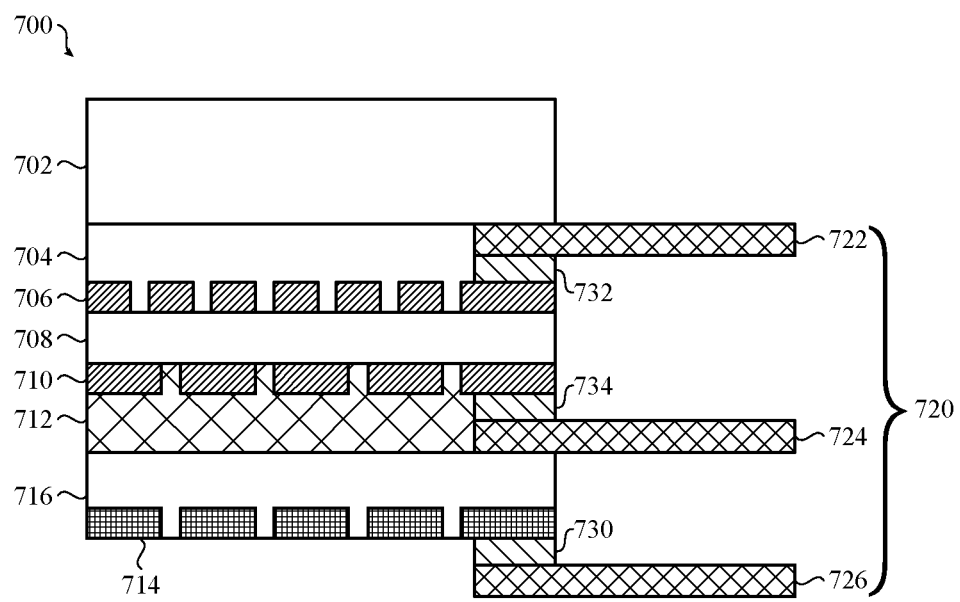

FIGS. 6 and 7 depict two other examples of stacks 600 and 700, respectively. Similar to the examples provided above, the stacks may incorporate at least two force-sensitive components that are formed from a different type of force-sensitive material having different sensitivities to a specific environmental condition and/or strain characteristics. Accordingly, the stacks 600 and 700 can also be used to produce a force sensor that is configured to compensate for changes in environmental conditions.

As shown in FIG. 6, the stack 600 includes a first layer 606, which is formed from an array of force-sensitive structures (traces) formed on a surface of a substrate 608. In some embodiments, the first layer 606 may be formed from a PEDOT material and the substrate 608 may be formed from a PET material. On the opposite side of the substrate 608 the layer the stack includes another array of force-sensitive structures (traces) formed on a respective surface of the substrate 608. In some embodiments, the force-sensitive structures of each array are configured to detect strain along different directions. For example, the first layer 606 may be formed from structures that are configured to sense strain along a first direction and the second layer 601 may be formed from structures that are configured to sense strain along a second direction that is perpendicular to the first direction.

As shown in FIG. 6, stack 600 also includes a third layer 614 disposed on a surface of a second substrate 616. The third layer 614 may include an array of force-sensitive structures (traces) formed form a material that is different than the first layer 606 and the second layer 610. In some embodiments, the third layer 614 is formed from an ITO material and the second substrate 616 may be formed from a PET material. As discussed previously, if two or more layers are formed from materials having different temperature and/or strain characteristics, the electrical response or property of the two structures may be used to compute a force estimate that compensates for variations in temperature.

The stack 600 depicted in FIG. 6 may be formed by the following example process. The stack 600 may be formed by, for example, patterning the third layer 614 (e.g., an ITO layer) on one side of the second substrate 616. The two other layers 606 and 610 (e.g., PEDOT layers) may be patterned on opposite sides of the first substrate 608. A first adhesive layer 612 may be used to bond the first substrate 608 to the second substrate 616. Similarly, a second adhesive layer 604 may be used to bond the sensor stack to other components of the display. In the present example, the second adhesive layer 604 bonds the first substrate 608 to a surface of the rear polarizer 602 of a display. The adhesive layers may be formed form an optically clear adhesive, pressure sensitive adhesive, or other suitable bonding material.

As shown in FIG. 6, an electrical connector 620 may be formed on a portion of the substrates. In particular, a first metal conductive layer 622 may be formed on a surface of the first substrate 624 and electrically coupled to structures of the first layer 606. A second metal conductive layer 624 may be formed on an opposite surface of the first substrate 624 and electrically coupled to the structures of the second layer 610. A third metal conductive layer 626 may be formed on a surface of the second substrate 616 and electrically coupled to the structures of the third layer 614. The metal conductive layers 622, 624, and 626 may be formed from a silver or other electrically conductive material.

FIG. 7 depicts another embodiment of a stack 700 having force-sensing structures formed from different materials. Stack 700 is similar to stack 600 except that the electrical connector 720 is formed by attaching electrical conduits 722, 724, 726 are electrically connected to the sensor layers by electrical connections 732, 734, 730, respectively. The electrical conduits 722, 724, 726 may be formed as a flexible circuit or other type of flexible conduit. Similar to the previous example, a first layer 706 and second layer 710 are formed on opposite sides of a first substrate 708. The first layer 706 and second layer 710 may be formed from a PEDOT material. A third layer 714 may be attached to a second substrate 716. The third layer 714 may be formed form a different material, such as ITO. The first substrate 708 may be bonded to the second substrate 716 by a first adhesive layer 712. Similarly, first substrate 708 may be bonded to another layer of the display stack, such as the rear polarizer 702 by a second adhesive layer 704.

Figure 8A:
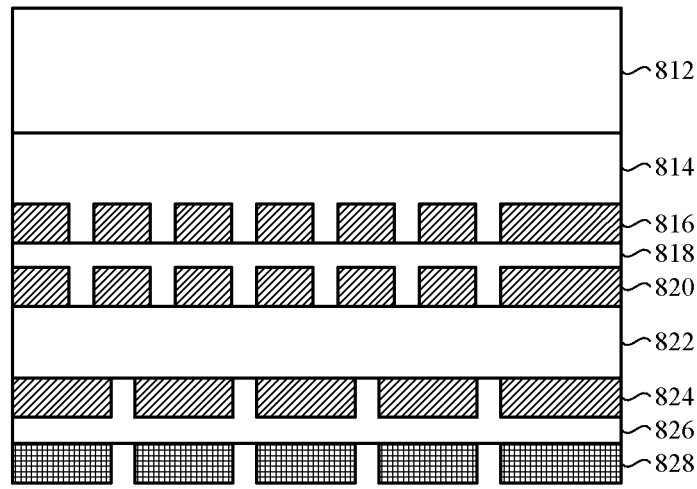
FIGS. 8A-D depict alternative configurations of force-sensitive structures.

FIGS. 8A-D depict alternative configurations of a force sensor having multiple types of force-sensitive component layers. FIG. 8A depicts an example stack 810 formed from two PEDOT layers 820, 824 disposed on either side of a single substrate 822. Each PEDOT layer 820, 824 may be formed from one or more sets of force-sensitive components (e.g., traces) generally oriented along a direction in the plane of the layer. In some cases, the traces of the two PEDOT layers 820, 824 are substantially perpendicular to each other, but otherwise may be oriented along any direction in the plane of the layer. The PEDOT layers are then passivizated forming passivation layers 818 and 826 and two ITO layers 816, 828 are formed on top of the respective passivation layers 818, 826. The ITO layers 816, 828 may also be formed from traces oriented in a direction in the plane of the layer and the traces of the two layers are typically substantially perpendicular to each other. An adhesive layer 814 (e.g., an OCA) can be used to bond the force-sensitive layers to the rear polarizer 812 of a display.

Figure 8B:
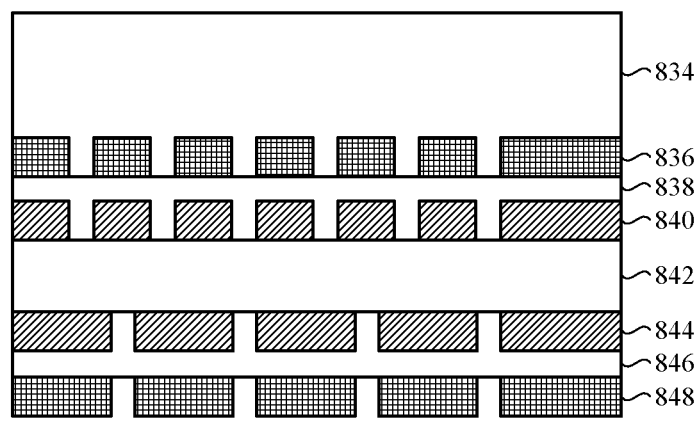

FIG. 8B depicts a similar configuration 8300, but with two ITO layers 840, 844 deposed on either side of the substrate 842. In a similar fashion, the ITO layers 840, 844 are passivated and two PEDOT layers 836, 848 are formed on top of the respective passivation layers 838, 846. The force sensitive-structure may be bonded to or formed on a surface of the rear polarizer 834 of a display.

Figure 8C:
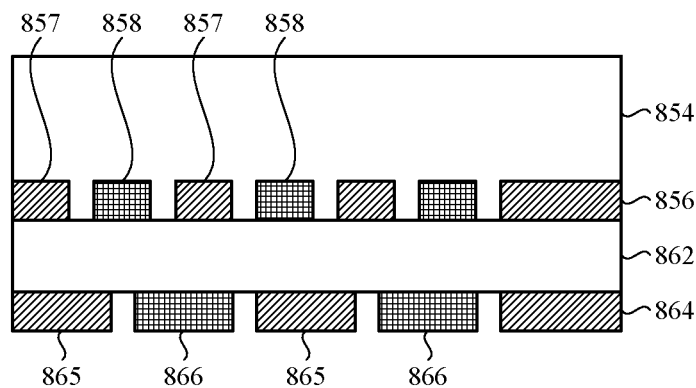

FIG. 8C depicts an example stack 850 having layers that are formed from two materials in the same layer. For example, a first layer 856 may be formed from ITO components 857 and PEDOT components 858 formed on the surface of a substrate 862. Similarly, a second layer 864 may be formed from ITO components 865 and PEDOT components 866. In the present embodiment, the ITO and PEDOT components of each layer may alternate. However, the specific arrangement of the ITO and PEDOT layers may vary depending on the application. The force-sensing structure may be attached to other layers of a display stack by an adhesive layer 854.

Figure 8D:
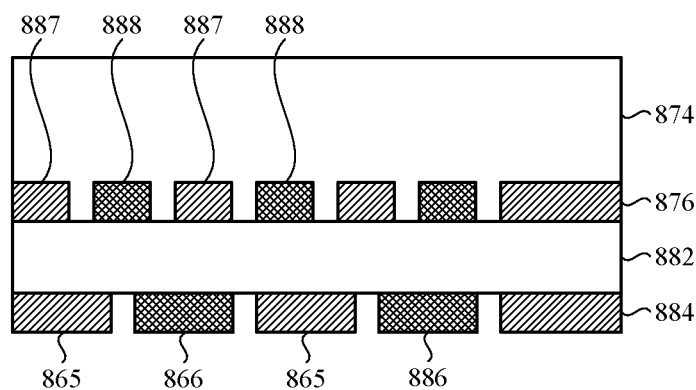

FIG. 8D depicts an example stack 870 having layers that are formed from materials having different properties in the same layer. For example, a first layer 876 may be formed from two types of PEDOT material. In some embodiments, the first layer 876 may be formed from alternating PEDOT components 887 and PEDOT components 888 having different PEDOT:SS ratios formed on a surface of the substrate 882. In some embodiments, the alternating PEDOT components 887 and PEDOT components 888 may be chemically treated to produce different temperature and/or strain sensitivities. Similarly, a second layer 884 may be formed from alternating PEDOT components 885 and PEDOT components 886 having different temperature and/or strain sensitivities. The force-sensing structure may be attached to other layers of a display stack by an adhesive layer 874.

As described with respect to the embodiments above, the amount of deflection can be estimated based on a measured electrical property of the force-sensitive component. In some cases, the changes in the electrical property to be measured are relatively small over normal operating conditions. For example, the change in resistance due to a deflection caused by an applied force may be very small and may vary less than changes in resistance due to normal temperature variations. In this case, a direct resistance measurement may be difficult to measure and may be susceptible to noise or other measurement artifacts.

Thus, in some cases, it may be advantageous to measure an electrical property of one component region using one or more reference component regions in order to increase the sensitivity of the measurement and reduce the effects of noise or other measurement artifacts. Using a reference component region may also help to reduce the effects of normal temperature variations on a resistance measurement.

In one example, multiple pixel regions are formed the force-sensitive component. The pixel regions may form a grid of sensor pixels that can be used to detect deflection over a respective pixel area. In this case, one or more pixels may be used as a reference pixel to increase the sensitivity of the measurement of the electrical property of a primary pixel that is being measured. The following example is provided with respect to a measurement of the resistance of a pixel. However, in other embodiments, another type of electrical property may be measured using a similar technique.

Figure 9:
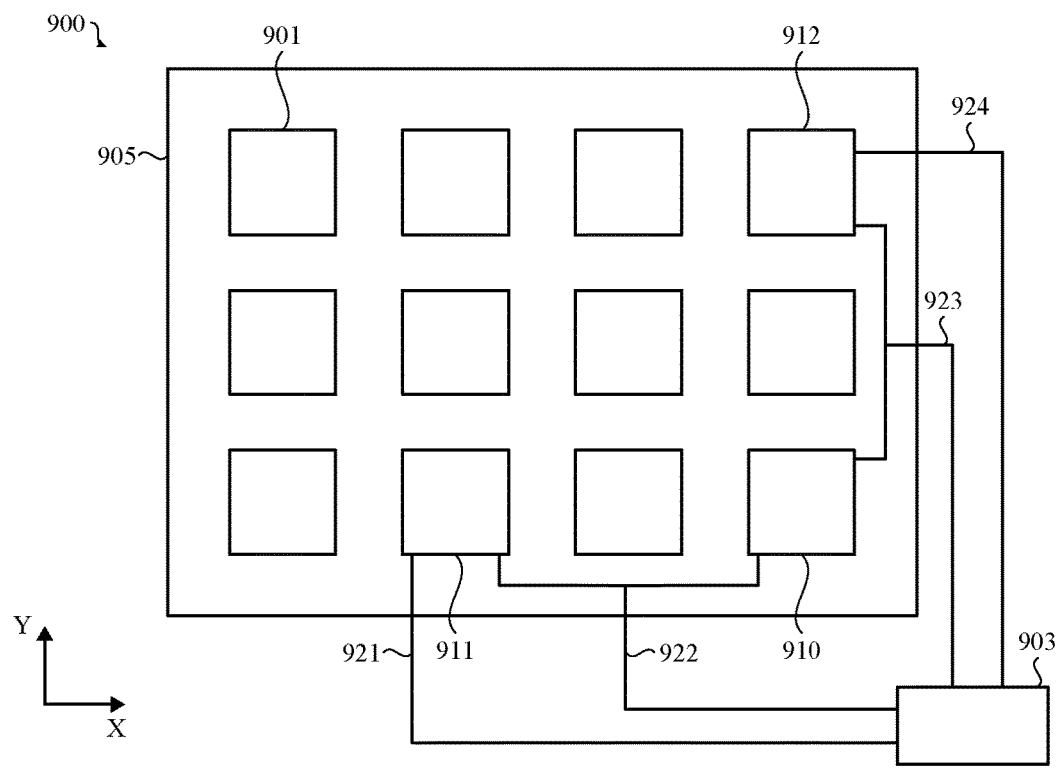
FIG. 9 depicts an example of a force-sensitive component including an array of pixel elements.

FIG. 9 depicts an example of a force-sensitive component layer that may be integrated into a device (e.g., device 100 of FIG. 1). As shown in FIG. 9, the force-sensitive component layer 900 may be formed from an array of pixel elements 901 arranged along the X and Y axes on a substrate 905. Each of the pixels may be formed from a piezo-resistive or resistive material that changes in resistance due to a deflection in the component. Other types of force-sensitive component materials having other force-sensitive properties could also be used.

In this example, every other pixel element 901 in the array is configured to serve as a reference pixel for each other. That is, for any pixel measurement in the array, there is a primary pixel and a reference pixel, where the primary pixel and the reference pixel are separated by at least one other pixel. A measurement of each of the pixels 901 may be performed with each of the pixels being sequentially designated as the primary pixel.

With regard to FIG. 9, an example primary pixel is designated as 910. When measuring the electrical property (e.g., resistance) of the primary pixel, one or more reference pixels (e.g., 911, 912) can be used to improve the sensitivity of the measurement. In this example, resistance measurement is taken both at the primary pixel 910 and one or more of the reference pixels (911, 912). The resistance measurement may be taken using the example conductive traces depicted in FIG. 9 (921, 922, 923, 924). Conductive traces to the other pixels 901 in the array are not shown for clarity. Also, other conductive trace configurations may be used to measure the resistances of the pixels in the array.

In this example, sense circuitry 903 is configured to bridge the resistances of the primary and one or more of the reference pixels using, for example, a Wheatstone Bridge circuit configuration. For example, the sense circuitry 903 may monitor or measure the voltage of a half bridge formed between one reference pixel 911 and the primary pixel 912. Another half bridge could be formed between the other reference pixel 912 and the primary pixel 912. In this example, the sense circuitry 903 is configured to balance the changes in the resistance between the two half bridges to increase the sensitivity of measurement. That is, small changes in resistivity of the primary pixel can be more easily detected using the balanced bridge configuration. Furthermore, the bridge configuration may also compensate for variations in resistance due to normal variations in temperature because the primary and reference pixels may all be subjected to approximately the same temperature conditions.

As mentioned above, it may be advantageous to select a reference pixel that is separated from the primary pixel by at least one other pixel. Using this technique may result in a reference measurement that is more likely to be taken at the same environmental conditions but less likely to be subjected to the same deflection condition. For example, a reference pixel that is separated from the primary pixel by at least one other pixel is close enough that it will likely be at a temperature that is very similar to the primary pixel. Additionally, because the reference pixel is at least one pixel away from the primary pixel, it is likely that it will not be subjected to the same deflection conditions.

In some embodiments, a second array of pixel elements is disposed on the opposite side of the substrate 905. The second array of pixel elements may also be arranged along the X and Y axes similar to the first array of pixel elements 901 depicted in FIG. 9. In one example, the first array of pixel elements are formed from an array of traces generally oriented along an X-axis forming an X-strain gauge element. The second array of pixels may be formed from an array of traces generally oriented along a Y-axis forming a Y-strain gauge element. In some embodiments, the second array of pixel elements may be staggered or offset with respect to the first array of pixel elements.

In this configuration, both first and second pixel arrays may be used to perform force detection in situations where multiple touches are employed. For example, if a first touch is generally located at the primary pixel 910 and a second touch is located at one of the reference pixels (911, 912) a half bridge sensing configuration may not detect either touch because the resistance of both the primary and reference pixel will change due to the two touches canceling out the measured change in resistance. In this case, because the pixel elements of the second array are offset of staggered with respect to the first array of pixel elements, a bridge formed between the primary and reference pixel of the second array will likely not be canceled and may be used to detect the two touches.

In one exemplary embodiment, a group of four alternating pixel elements may be connected to form a full bridge. In this case, it may be advantageous that every other pixel element be formed from an array of traces generally oriented along either the X or Y axis. That is, the pixel elements in the array alternate between being oriented along the X and Y axes. In the case of two touches, each touch on a primary and reference pixel element of a bridge, differences in the X-direction strain and the Y-direction strain may be used to detect the two touches. This effect may be more pronounced if the pixel elements are rectangular in shape and alternating in orientation by 90 degrees along a row or column of the array. This configuration may provide improved noise rejection and better temperature compensation as compared to a two-layer configuration.

The examples provided above are directed to pixel elements formed from an array of conductive traces generally oriented along either the X-axis or Y-axis to detect either an X strain or a Y strain respectively. However, in some embodiments, the conductive traces may be generally oriented at an angle with respect the X or Y axis to detect strain along a variety of different directions. Depending on the structural and mechanical characteristics of the sensor, the direction of the maximum strain may be locate at an angle with respect to the X or Y axes. In this case, it may be advantageous to orient the traces of the pixel elements to measure strain along the direction of maximum strain.

Although the examples described above are drawn to a rectilinear array of pixel elements, other pixel configurations could also be used. For example, a polar array or other geometric arrangement of pixel elements may be formed on one or both sides of a substrate. Also, more than one pixel element may separate the primary pixel from the reference pixel, depending on the geometry of the pixel array. Also, one, two, or more than two reference pixel elements may be used to measure the electrical property of the primary pixel element.

Because the magnitude of the measurements are relatively small, in some embodiments, the sense circuitry 903 includes a low noise amplifier, such as a programmable gain amplifier (PGA) to help detect and measure changes in resistance of the pixel elements 901. The PGA may also be connected to a delta-sigma analog-to-digital converter (ADC) and a digital filter to improve the performance of the sense circuitry 903. The sense circuitry 903 may contain multiple PGA, ADC, and filter elements to detect and measure changes in resistance over the entire array of pixel elements 901. In some cases, a multiplexer is used to combine conductive lines from multiple pixel elements 901 into a single PGA and ADC. This is one example, and other sensing configurations may also be employed for the sense circuitry 903

To improve the performance of the sensor, a ground shield layer having low impedance to ground may also be used. The use of a ground shield layer may reduce or eliminate noise due to low-magnitude voltage variations that may interfere with the measurement of the pixel elements. In one embodiment, a ring of silver material is formed around the perimeter of the ground shield layer to help to shield the array from noise.

In some embodiments, a differential measurement scheme may be used to reduce non-uniformity error in the array of pixel elements. Non-uniformity error may be caused by, for example, variations in the structural and mechanical characteristics of the sensor over the entire area. For example, a force applied at the top-center of the sensor may produce a different strain profile that than a fore applied at the absolute center of the sensor. To reduce the effect of these types of non-uniformities, a differential measurement may be taken at a location that is offset from the location of the touch and used to reduce the variation in the measurement due to the non-uniformity.

In addition, the strain response of a sensor may vary due to manufacturing tolerances and variability in the properties of the materials. In some cases, an array of pixel elements can be measured at the time of manufacture and a set of calibration coefficients can be calculated and stored. The set of calibration coefficients may be used to reduce the variability of a sensor response due from device to device.

In accordance with some embodiments described herein, a force-sensitive component or structure may be integrated with a display element or other element of a device using a bonding agent, such as a pressure sensitive adhesive (PSA) layer. Depending on the stackup configuration, the mechanical properties of the pressure sensitive component may affect the sensitivity and performance of a force-sensitive component.

Figure 10:
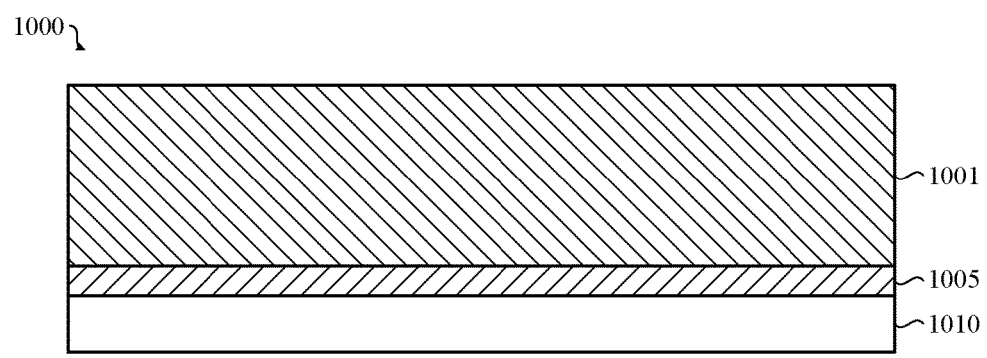
FIG. 10 depicts a example force-sensitive structure including a pressure-sensitive adhesive and a force-sensitive component.

FIG. 10 depicts a sample stackup 1000 having a force-sensitive component 1010 attached to a display stack 1001 by a PSA layer 1005. In this example, a force that is applied to the display stack 1001 is transmitted through the PSA layer 1005 to the force-sensitive component 1010.

In one example, the PSA layer 1005 may be relatively elastic and have an elasticity of, for example, approximately 0.3 MPa. In this case, the deflection in the force-sensitive component 1010 may be reduced because of the compliance in the PSA layer 1005. This may reduce the sensitivity of the device, which may limit the lower bound of the force that can be practically and reliably measured. However, using a PSA layer 1005 that is relatively elastic may also be beneficial because it may result in a deflection of the force-sensitive component 1001 that is more desirable from another aspect. For example, the deflection may be more evenly distributed across the force-sensitive component 1001, which may be advantageous in some circumstances.

In one example, the PSA layer 1005 may be relatively inelastic and have an elasticity of, for example, approximately 1000 MPa. In this case, the deflection in the force-sensitive component 1010 may be increased because of the reduced compliance in the PSA layer 1005. This may increase the sensitivity of the device, which will improve the ability of the device to detect a relatively small applied force. However, using a PSA layer 1005 that is relatively inelastic may be less desirable in certain cases. For example, the deflection may be too great in areas resulting in clipping or plateauing of the measurement that can be taken of the force-sensitive component 1001.

In some cases, the PSA layer 1005 may have a medium elasticity that is a balance of the two examples provided above. For example, the PSA layer 1005 may have an elasticity of approximately 1 MPa. In this case, the PSA layer 1005 may be elastic enough to produce a smooth predictable deflection in the force-sensing component 1001 without resulting in plateauing or clipping of the measurement.

Figure 11:
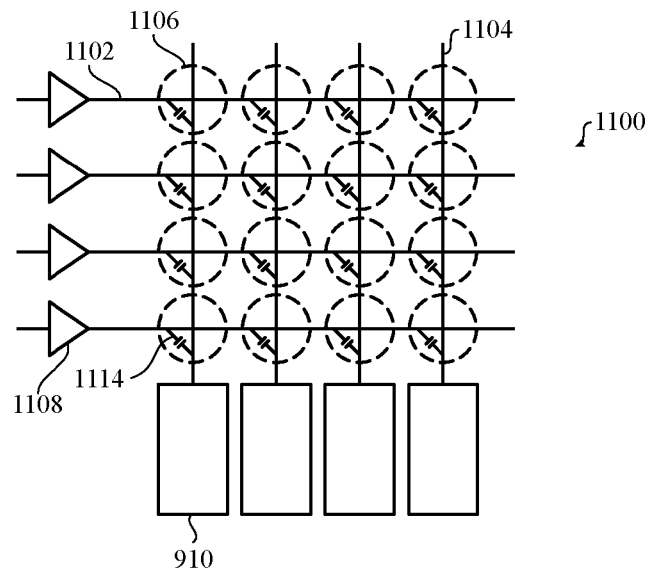
FIG. 11 depicts an example of touch sensor.

FIG. 11 illustrates a sample touch sensor 1100 according to some embodiments of the disclosure. Touch sensor 1100 can include an array of touch nodes 1106 that can be formed by a two-layer electrode structure separated by a dielectric material. One layer of electrodes can comprise a plurality of drive lines 1102 positioned substantially perpendicular to another layer of electrodes which can comprise a plurality of sense lines 1104, with each of the nodes 1106 having an associated mutual capacitance 1114 (also referred to as coupling capacitance). The drive lines 1102 and sense lines 1104 cross over each other in different planes separated from one another by a dielectric. Alternatively, in other embodiments the drive lines 1102 and sense lines 1104 can be formed by a one-layer electrode structure.

Drive lines 1102 (also referred to as rows, row traces, or row electrodes) can be activated by a stimulation signal provided by respective drive circuits 1108. Each of the drive circuits 1108 can include an alternating current (AC) voltage source referred to as a stimulation signal source. To sense touch event(s) on the touch sensor 1100, one or more of the drive lines 1102 can be stimulated by the drive circuits 1108, and the sense circuitry 1110 can detect the resulting voltage values from the sense lines 1104. The voltage values can be indicative of a finger or object altering charge from the mutual capacitance signal. The detected voltage values can be representative of node touch output values, with changes to those output values indicating the node locations 1106 where the touch events occurred and the amount of touch that occurred at those location(s).

Figure 12:
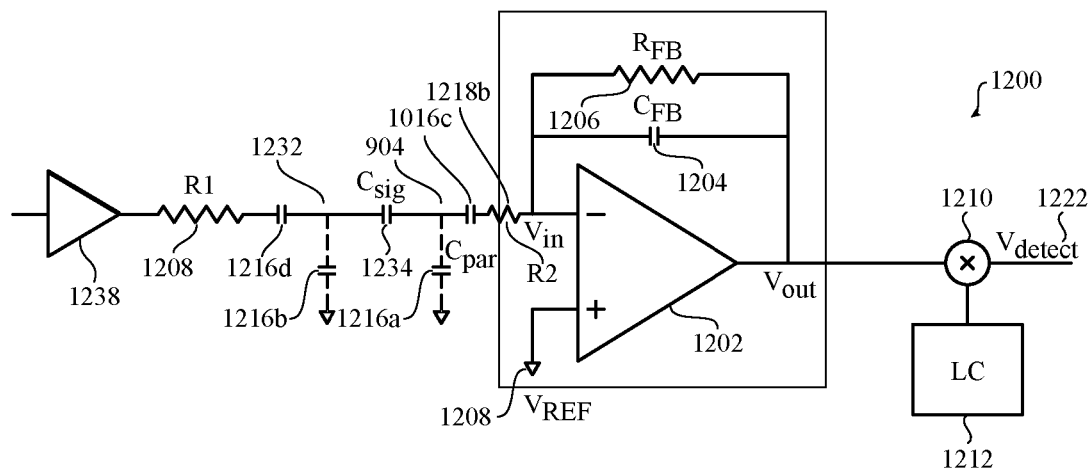
FIG. 12 depicts an example of a sense circuit for a touch sensor.

FIG. 12 illustrates a sample sense circuit 1200, which is an example of the sense circuit 1110 of FIG. 11. Drive circuit 1108 can produce drive signals (also referred to as stimulation signals $V_{stim}$), which can be transmitted on drive lines 1102 that contain a line resistance 1218 and coupled onto sense lines 1104 due to mutual capacitance 1114 (referred to as $C_{sig}$) between the drive and sense lines. The coupled signal can then be received by sense amplifier 1214. Sense amplifier 1214 can include operational amplifier 1202, and at least one of a feedback resistor 1206 and a feedback capacitor 1204. FIG. 12 is shown for the general case in which both resistive and capacitive feedback elements are utilized. The signal can be inputted into the inverting input (referred to as $V_{in}$) of the operational amplifier 1202, and the non-inverting input can, in some embodiments, be tied to a reference voltage $V_{ref}$ at 1208. If $V_{stim}$ is a sinusoidal signal (such as an AC signal), the output of the amplifier, $V_{out}$, should also be a sinusoid. Moreover, $V_{out}$ should be a sinusoid that possesses the same frequency as $V_{stim}$ with a phase shift. For example, if $$V_{stim} = A\sin(\omega t), \text{ then} \qquad \text{Equation 3}$$

$$V_{out} = B\sin(\omega t + \varphi), \qquad \text{Equation 4}$$

where $\varphi$ is the phase shift. The value of $\varphi$ can be influenced by many factors, including any parasitic capacitance 1216 ($C_{par}$) encountered by the sense circuit 1200. Parasitic capacitance 1216 can be characterized as any capacitance other than the mutual capacitance 1114 between the drive lines 1102 and sense lines 1104 which is the capacitance of interest. The parasitic capacitance may be connected in series with $G_{sig}$ as shown at 1216c and 1216d or may alternatively be connected in parallel as shown at 1216a or 1216b. The number 1216 is used to represent any one or more of the parasitic capacitances 1216a-1216d. There can be multiple factors that contribute to the value of parasitic capacitance 1216 including coupling with metallic elements within the display and variations in the air gap or other resilient members of the stack up. As shown in FIG. 12, $V_{out}$ can then be heterodyned by being fed into a multiplier 1210, and multiplied with a local oscillator 1212 to produce $V_{detect}$ 1222. The direct current (DC) portion of $V_{detect}$ 1222 can be used to detect if a touch or proximity event has occurred.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A force sensor for detecting an input force on a surface of a device, the force sensor comprising:
    a substrate below the surface and comprising:
        a first strain-sensitive component having a first temperature-dependent response and disposed on a first surface of the substrate; and
        a second strain-sensitive component having a second temperature-dependent response and disposed on a second surface of the substrate opposite the first surface; and
    a sensor circuit configured to detect a change in an electrical property of the first and second strain-sensitive components, thereby generating a force input estimate that compensates for a variation in temperature between the first strain-sensitive component and second strain-sensitive component as a result of a difference between the first temperature-dependent response and the second temperature-dependent response; wherein
    the first and second temperature-dependent responses are different.

2. The force sensor of claim 1, wherein
    the first strain-sensitive component has a first strain-dependent response and the second strain-sensitive component has a second strain-dependent response, and
    a strain ratio between the first and second strain-dependent responses is different than a temperature ratio between the first and second temperature-dependent responses.

3. The force sensor of claim 1, wherein the substrate is positioned below a display.

4. The force sensor of claim 3, wherein the display comprises one of a light emitting diode display, a liquid crystal display, or an organic light emitting diode display.

5. The force sensor of claim 1, wherein the substrate is formed from an optically transparent material.

6. The force sensor of claim 1, wherein the substrate is disposed below a touch sensing layer positioned below the surface.

7. The force sensor of claim 1, wherein the first strain-sensitive component is formed from an optically transparent material.

8. The force sensor of claim 1, wherein the substrate comprises an array of strain-sensitive components including the first strain-sensitive component.

9. The force sensor of claim 8, wherein:
    the array of strain sensitive-components is a first array of strain-sensitive components; and
    the substrate comprises a second array of strain-sensitive components including the second strain-sensitive component, the second array of strain-sensitive components oriented orthogonal to the first array of strain-sensitive components.

10. The force sensor of claim 9, wherein:
    the substrate comprises:
        a first set of electrodes disposed on the first surface and coupled to the first array of strain-sensitive components; and
        a second set of electrodes disposed on the second surface and coupled to the second array of strain-sensitive components.

11. The force sensor of claim 10, wherein at least one electrode of the first set of electrodes is shared by at least two strain-sensitive component of the first array of strain-sensitive components.

12. The force sensor of claim 1, wherein the electrical property comprises inductance.

13. The force sensor of claim 1, wherein the electrical property comprises resistance.

14. A force sensor for measuring input force applied to a surface, the force sensor comprising:
    a substrate comprising:
        a primary sensing component disposed on the substrate; and
        a reference sensing component having disposed on the substrate and offset from the primary sensing component; and
    a sensor circuit configured to detect a change in an electrical property of the primary and reference sensing components, thereby generating an input force estimate that compensates for temperature of the primary sensing component as a result of a difference in location between the primary component and the reference sensing component; wherein
    the change in the electrical property of the primary reference sensing component is different than the change in the electrical property of the secondary reference sensing component.

15. The force sensor of claim 14, wherein the primary sensing component is optically transparent.

16. The force sensor of claim 15, wherein the primary sensing component is disposed above a display.

17. The force sensor of claim 14, wherein:
    the reference sensing component is a first reference sensing component; and
    the substrate further comprises an array of reference sensing components, including the reference sensing component.

18. The force sensor of claim 17, wherein the sensor circuit is configured to detect the change in the electrical property of the primary sensing component and each of the reference sensing components of the array of reference sensing components to generate the input force estimate.

19. An electronic device comprising:
    an input surface;
    a force sensor disposed below the input surface and comprising:
        a substrate; comprising
        an array of strain-sensitive components, the array comprising:
            a primary strain-sensitive component; and
            a subarray of secondary strain-sensitive components; and
    a sensor circuit configured to:
        select the primary strain-sensitive component from the array of strain-sensitive components;
        select the subarray of secondary strain-sensitive components from the array of strain-sensitive components; and
        detect a first change in an electrical property of the primary strain-sensitive component; and detect a second change in an electrical property of the subarray of secondary selected strain-sensitive components, thereby generating an input force estimate that compensates for temperature of the selected primary sensing component as a result of a difference in location between the primary component and each secondary strain-sensitive component of the subarray of secondary strain-sensitive components; wherein the first change is different than the second change.

20. The electronic device of claim 19, wherein a display is disposed between the input surface and the force sensor.

* * * * *